United States Patent [19]

Sakurada et al.

[11] 4,387,862

[45] Jun. 14, 1983

[54] SEAT BELT RETRACTOR

[75] Inventors: Kenichi Sakurada, Yokohama; Hiroyuki Yoshida, Tokyo; Tadahiko Ozaki, Kosai, all of Japan

[73] Assignee: Nissan Motor Company, Limited, Yokohama, Japan

[21] Appl. No.: 241,131

[22] Filed: Mar. 6, 1981

[30] Foreign Application Priority Data

Mar. 8, 1980 [JP] Japan .................................. 55/29354

[51] Int. Cl.³ ........................ A62B 35/00; B65H 75/48
[52] U.S. Cl. ................................. 242/107.6; 280/807; 297/475
[58] Field of Search ............. 242/107.6, 107.7, 107.12; 280/806, 807, 803; 180/268–270; 297/475–478

[56] References Cited

U.S. PATENT DOCUMENTS 4,198,011  4/1980  Kamijo et al. .................. 242/107.7
4,261,531  4/1981  Naitoh ............................. 242/107.6

FOREIGN PATENT DOCUMENTS 2012560  8/1979  United Kingdom ............. 242/107.7

Primary Examiner—John M. Jillions

[57] ABSTRACT

A seat belt retractor for a safety belt arrangement having a seat belt for reliably restraining and safely protecting a seat belt occupant, comprises belt retracting means for retracting the seat belt, belt slackening means for slackening the seat belt by allowing the seat belt to be pulled out by a predetermined length after the seat belt is retracted and tightened on the seat occupant by the seat belt retracting means; tension eliminating means for permitting the seat belt to assume a tensionless belt position where the seat belt is maintained tensionless after being slackened by the belt slackening means; and tensionless belt position memorizing means for memorizing the tensionless belt position of the seat belt so as to enable the seat belt to be retracted to the tensionless position by the belt retracting means when the seat belt is pulled out beyond the tensionless belt position of the seat belt.

1 Claim, 7 Drawing Figures

SEAT BELT RETRACTOR

FIELD OF THE INVENTION

The present invention relates in general to safety seat belt arrangements equipped in automotive vehicles, and more particularly to a seat belt retractor of a type having a tension eliminator and a tensionless belt position memorizing mechanism which memorizes a tensionless belt position of a seat belt.

DESCRIPTION OF THE PRIOR ART

Seat belts which have thus far been employed in vehicles have had problems in that they impart oppresive/or unpleasant feelings to seat occupants over their breasts by putting the tightened or taut seat belt on the breasts. In order to avoid such unpleasant feelings suffered by the seat occupants, there has conventionally been proposed a wide variety of seat belt retractors which are so designed as to permit the retractor to eliminate or neutralize tensions in the seat belt. One of the seat belt retractors comprises a tensionless belt position memorizing mechanism which memorizes a tensionless belt position when a tongue is inserted into a buckle. In such a conventional seat belt retractor, however, there are arisen some problems undesirable and tedious for the seat occupant. For example, a sufficient slack remains in the seat belt if the tongue and buckle are engaged with the seat belt sufficiently slackened, which makes it impossible to reliably restrain and safely protect the seated passenger against a violent shock caused by sudden stops and accidents of the passenger car. On the contrary, if the seat belt is tightened or taut on the body of the seated passenger, he or she suffers from unpleasant and oppressive feelings when wearing the seat belt.

Another seat belt retractor of this type has been proposed which necessitates retraction of a seat belt after a tensionless belt position memorizing mechanism has been operated for changing an adequate tensionless belt position due to mistaken manipulation of the seat belt retractor and movement of the passenger seat by the seated passenger. Such retracting operation also gives rise to tedious and laborious burden on the seated passenger.

STATEMENT OF THE OBJECTS OF THE INVENTION

It is therefore an object of the present invention to provide an improved seat belt retractor which memorizes a tensionless belt position in the seat belt which is adequately slackened after being worn by the seated passenger to the extent that he or she does not suffer from the oppressive and uncomfortable feelings and is safely protected from the violent shock caused by the sudden stops and accidents of the passenger car.

It is another object of the present invention to provide an improved seat belt retractor which facilitates cancelling of the undesirable memorized tensionless belt position of the seat belt whenever the seated passenger wishes to cancel that belt position due to mistaken manipulation of the seat belt retractor and movement of the passenger seat.

SUMMARY OF THE INVENTION

In order to achieve these objects, the present invention proposes a seat belt retractor for a safety belt arrangement having a seat belt attached with a buckle and a tongue engageable with each other for reliably restraining and safely protecting a seat occupant against serious injury in the case of emergency as in a collision or sudden stop of a passenger vehicle, comprising: belt retracting means for imparting a tension to the seat belt to retract the seat belt; signal emitting means operative to detect an engagement state of the buckle and the tongue for emitting an operative signal and to detect a disengagement state of the buckle and the tongue for emitting an inoperative signal; belt slackening means for slackening the seat belt by allowing the seat belt to be pulled out by a predetermined length after the seat belt is retracted and tightened on the seat occupant by the belt retracting means; tension eliminating means for permitting the seat belt to assume a tensionless position where the seat belt is maintained tensionless after being slackened by the belt slackening means; clutching means for connecting the belt retracting means to the belt slackening means and the tension eliminating means so as to have the belt slackening means operative to allow the seat belt to pulled out by the predetermined length when receiving the operative signal from the signal means and for disconnecting the retracting means from the belt slackening means and the tension eliminating means so as to have the belt slackening means inoperative to allow the seat belt to be pulled out by the predetermined length when receiving the inoperative signal from the signal emitting means; and tensionless belt position memorizing means for memorizing the tensionless belt position of the seat belt so as to enable the seat belt to be retracted to the tensionless position by the belt retracting means when the seat belt is pulled out beyond the tensionless belt position of the seat belt.

BRIEF DESCRIPTION OF THE DRAWINGS

Other objects and advantages of the present invention will become clear from the following description taken in conjunction with the accompanying drawings, in which.

DETAILED DESCRIPTION OF THE PREFERRED EMBODIMENT

Figure 1:
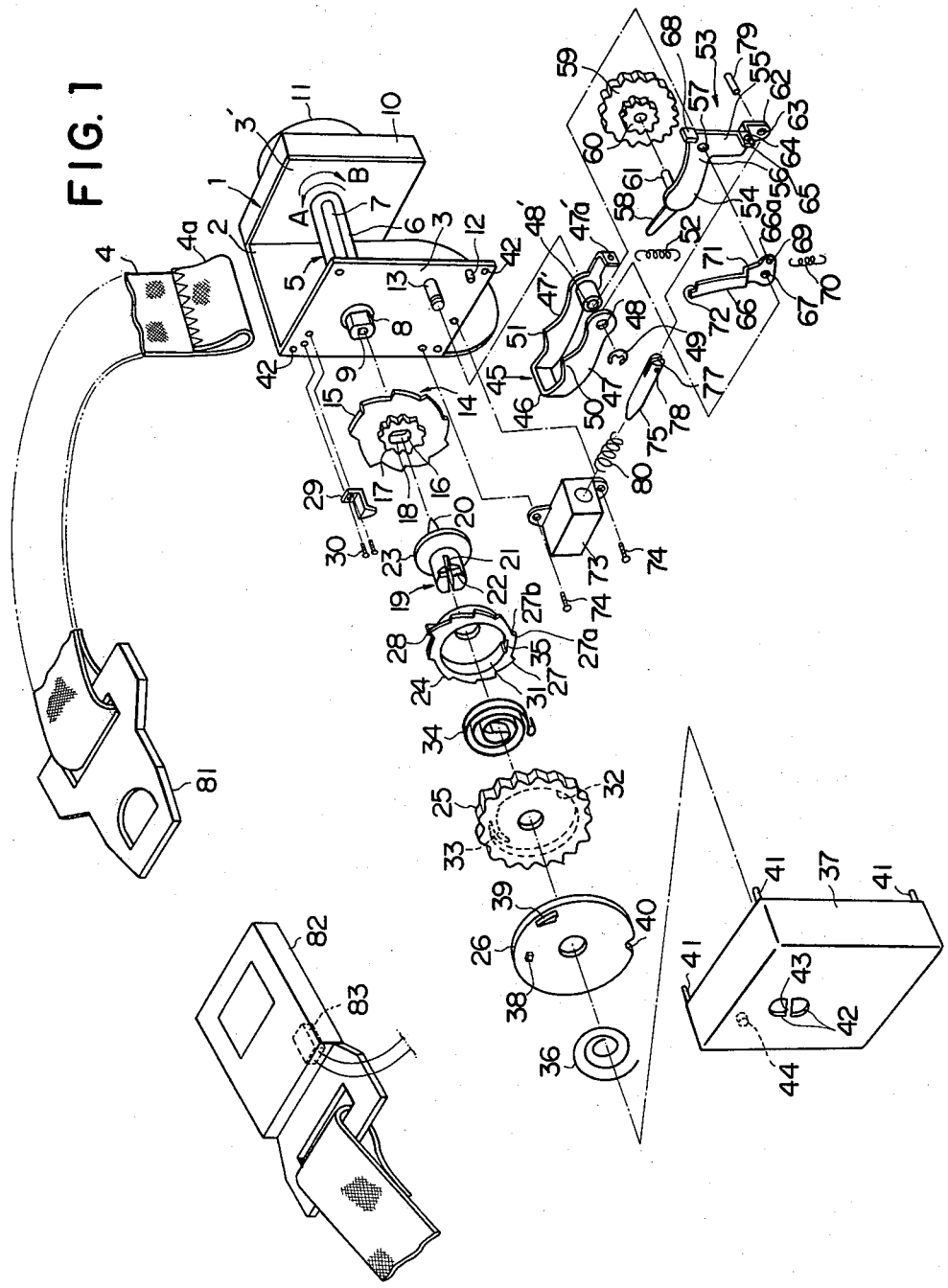
FIG. 1 is an exploded view of a seat belt retractor according to the present invention.
Figure 2:
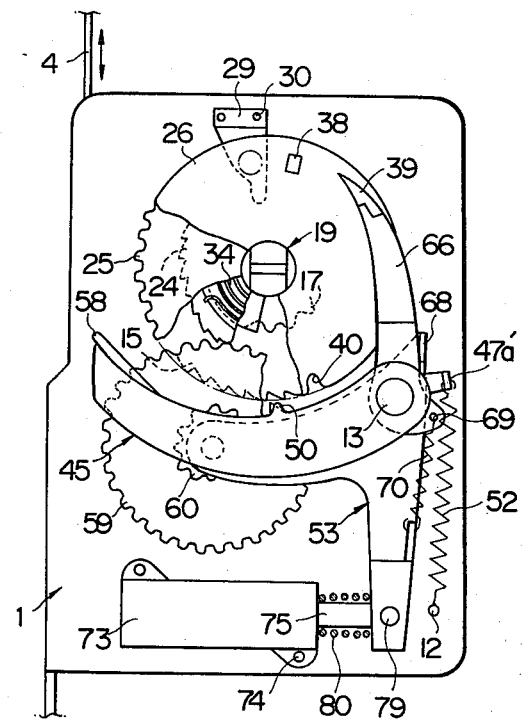
FIG. 2 is a side view, partly broken away, of the seat belt retractor in FIG. 1 and showing an operational stage of the seat belt retractor under which a seat belt is sufficiently retracted in the seat belt retractor.
Figure 3:
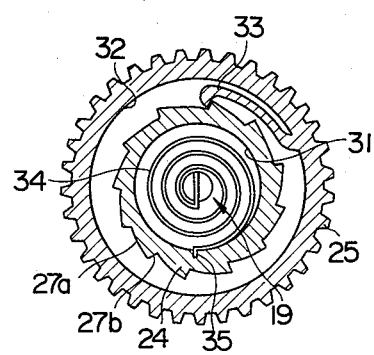
FIG. 3 is a cross-sectional view showing a driven gear, a pawl member secured to the inner periphery of the driven gear, a ratchet wheel engaged with the pawl member, and a spiral spring resiliently restraining the rotation of the ratchet wheel.

Referring now to the drawings, and in particular to FIG. 1. there is shown a seat belt retractor embodying the present invention which comprises a retractor housing 1 generally U-shaped and having a base wall portion 2 and a pair of parallel side wall portions 3 and 3' spaced apart from each other and integrally connected to the base wall portion 2 so as to allow a seat belt 4 to be housed therebetween. The retractor housing 1 is adapted to be securely connected to a suitable body portion or a seat portion of a vehicle by bolts. A winding reel 5 is rotatably supported on the side wall portions 3 and 3' of the retractor housing 1 and has a longitudinally intermediate portion 6 formed with an axial slot 7 axially extending between the side wall portions 3 and 3' of the retractor housing 1. Through the axial slot 7 is passed the turned-back end portion 4a of the seat belt 4 which is keyed to the winding reel 5 as is well known in the art so that the seat belt 4 can be wound around the winding reel 5.

In the embodiment shown in FIG. 1, the seat belt 4 is to be wound around and unwound out of the winding reel 5 in counterclockwise and clockwise directions A and B, respectively, which are thus only referred to as "winding and unwinding directions" hereinafter for simplicity and better understanding of the description. For the similar reason, "the winding and unwinding directions" will be applied to all parts or elements, assembled in the seat belt retractor according to the present invention, which are rotated in the counterclockwise and clockwise directions A and B.

The winding reel 5 further has a non-circular end portion 8 projecting outwardly from the side wall portion 3 and formed with an axial pin hole 9 extending toward the intermediate portion 6 of the winding reel 5, and a remaining end portion also projecting axially outwardly from the side wall portion 3' to be drivably connected to an emergency locking mechanism 10 which is so constructed as to lock the winding reel 5 thus stopping the pulling-out of the seat belt 4 from the winding reel 5 when subjected to a shock upon emergency as in a collision or sudden stop of a passenger car. To the remaining end portion of the winding reel 5 axially outwardly of the emergency locking mechanism 10 is also drivably connected a return spring 11 which is also constructed as is well known in the art for always imparting a tension to the seat belt 4 and biasingly taking up the seat belt 4 around the winding reel 5. On the lower end corner of the side wall portion 3 of the retractor housing 1 is securely mounted a spring retaining pin 12 which extends outwardly from the side wall portion 3 in spaced and parallel relationship to the non-circular end portion 8 of the winding reel 5. On the side wall portion 3 between the spring retaining pin 12 and the non-circular end portion 8 of the winding reel 5 is securely mounted a swing arm retaining pin 13 which also extends outwardly from the side wall portion 3 in spaced and parallel relationship to the spring retaining pin 12 and the non-circular end portion 8.

A ratchet wheel 14 is formed at its circumference with a plurality of teeth 15 and at its central portion with a non-circular hole 16 which is in mating engagement with the non-circular end portion 8 of the winding reel 5. A drive gear 17 is integrally formed with the ratchet wheel 14 and also has a non-circular hole 18 which is in axial alignment with the non-circular hole 16 and which is also in mating engagement with the non-circular end portion 8 of the winding reel 5.

A shaft member 19 is formed at its one end with a tapered or sharpened point 20, which engages the axial pin hole 9 formed in the non-circular end portion 8 of the winding reel 5, and at the other end with a slit 21 and a pair of cut-away portions 22 which cooperate to provide a secure connection between the shaft member 19 and a cap member which will become apparent as the description proceeds. An annular flange 23 is formed on the intermediate portion of the shaft member 19 between the sharpened point 20 and the cut-away portions 22.

On the shaft member 19 are disposed rotatably a ratchet wheel 24, a driven gear 25 and a disc member 26 which are arranged in this order from the annular flange 23 of the shaft member 19 toward the cut-away portions 22 thereof. The ratchet wheel 24 has a plurality of teeth 27 each of which is so profiled as to have a curved portion 27a and an outward linear portion 27b so that the ratchet wheel 24 can be rotated in the unwinding direction of the winding reel 5 but can not be rotated in the winding direction thereof by a pawl hereinafter described. On the outward linear portion 27b of one of the teeth 27 is securely mounted an abutment 28 which is engageable with a stopper 29 fixedly mounted on the side wall portion 3 of the ratractor housing 1 by two screws 30. The ratchet wheel 24 is formed at its side face opposing to the driven gear 25 with a circular cross-sectioned concavity 31 which has a center axis in conincidence with the center axis of the ratchet wheel 24. The driven gear 25 is also formed at its side face opposing to the ratchet wheel 24 with a circular cross-section concavity 32 so as to allow the ratchet wheel 24 to be rotatably received therein. To the inner periphery of the concavity 32 is secured a resilient pawl member 33 which engages one of the teeth 27 of the ratchet wheel 24 so that the ratchet wheel 24 can be rotated only in the unwinding direction of the winding reel 5. A spiral spring 34 has an inner end portion inserted into the slit 21 of the shaft member 19 and an outer end portion fixed to a cut-away slit 35 formed on the periphery of the concavity 31 of the ratchet wheel 24 so as to biasingly rotate the ratchet wheel 24 together with the driven gear 25 and the disc member 26 in the winding direction of the winding reel 5 if the ratchet wheel 24 is rotated together with the driven gear 25 and the disc member 26 in the unwinding direction of the winding reel 5 against the biasing force of the spiral spring 34 which is held in place at the stationary shaft member 19. The disc member 26 is biasingly urged by a conical spring 36 interposed between the disc member 26 and a cap member 37 so as to force the ratchet wheel 24, the driven gear 25, the disc member 26 toward the annular flange 23 of the shaft member 19 into frictional contact with one another. Under these conditions, the ratchet wheel 24, the driven gear 25 and the disc member 26 are not subjected to rotation of the ratchet wheel 14 and the driven gear 17 caused by the rotation of the winding reel 5 even if the conical spring 36 biasingly urges the disc member 26 toward the annular flange 23 of the shaft member 19 since the drive gear 17 is slightly spaced apart from the annular flange 23 of the shaft member 19 and the drive gear 17 and the ratchet wheel 14 are held in mating engagement with the non-circular end portion 8 of the winding reel 5. The disc member 26 is formed at its side face opposing to the cap member 37 with a stop projection 38 and a spear headed stop projection 39 which are arranged as will be particularly described hereinlater. A cut-away recess 40 is formed and arranged on the circumference of the disc member 26 with respect to the stop projections 38 and 39 and the function of the recess 40 will also be disclosed particularly hereinafter. The cap member 37 has four bolts 41 which pass through corresponding four holes 42 formed in the side wall portion 3 of the retractor housing 1 and is secured to the side wall portion 3 by screwing nuts (not shown) to the bolts 41 for forming a hollow space together with the side wall portion 3 so that the cap member 37 can house therein the ratchet wheel 14, the drive gear 17, the shaft member 19, the ratchet wheel 24, the driven gear 25, the disc member 26 and the conical spring 36. The cap member 37 is formed at its outer wall with two juxtaposed holes 42 and a bridge portion 43 arranged between the holes 42 which firmly receive the cut-away portions 22 of the shaft member 19 with the bridge portion 43 matingly inserted into the slit 21 of the shaft member 19 so that the shaft member 19 is maintained standstill irrespective of rotation of the ratchet wheel 14 and the drive gear 17. To the outer wall of the cap member 37 in the neighborhood of the holes 42 is secured another stop projection 44 which extends toward the disc member 26 in parallel with the shaft member 19 to be engageable with the above-mentioned stop projection 38 formed on the disc member 26.

A generally U-shaped swing arm 45 has a base wall portion 46 and a pair of parallel side wall portions 47 and 47' spaced apart from each other and integrally connected to the base wall portion 46. As will be best seen from FIG. 2 and FIGS. 4 to 7, the side wall portions 47 and 47' are arcuately formed having pin holes 48 ad 48' through which the swing arm retaining pin 13 passes with the forward end fixed by a snap ring 49 so that the swing arm 45 is swingable around the retaining pin 13 with respect to the side wall portion 3 of the retractor housing 1. The side wall portions 47 and 47' of the swing arm 45 is repectively formed on their longitudinally intermediate portion with a protrusion 50 and a pawl 51 which are engageable with the teeth 15 of the ratchet wheel 14 and the cut-away recess 40, respectively. A tension spring 52 is hooked at its lower end to the spring retaining pin 12 and at its upper end to a lug portion 47'a projecting rearwardly from the side wall portion 47' of the swing arm 45 so that the swing arm 45 is biased in a clockwise direction in FIG. 1. A trigger member 53 is profiled into a generally invented L-shape and has a horizontal portion 54 projecting toward the base wall portion 46 of the swing arm 45 and a vertical portion 55 integrally connected at its intermediate junction portion 56 with the horizontal portion 54. The trigger member 53 is formed at the junction portion 56 with a hole 57 through which the swing arm retaining pin 13 passes so that the trigger member 53 is swingable around the retaining pin 13 with respect to the swing arm 45. On the free end of the horizontal portion 54 of the trigger member 53 is formed a horn-like projection 58 which extends over the base wall portion 46 of the swing arm 45 to be engageable therewith. Idler gears 59 and 60 are integrally formed with each other and rotatably received on a supporting pin 61 which projects from the horizontal portion 54 of the trigger member 53 toward the side wall portion 47' of the swing arm 45. The idler gears 59 and 60 are adapted to be meshingly engaged with the drive gear 17 and the driven gear 25, respectively, when the trigger member 53 is rotated in a clockwise direction in FIG. 1. Downwardly projecting from the vertical portion 55 of the trigger member 53 is a lug 62 which is formed with a hole 63. Immediately above the lug 62 is formed another lug 64 which extends toward the side wall portion 47 of the swing arm 45, also having a hole 65. A stopper arm 66 is located between the trigger member 53 and the side wall portion 47 of the swing arm 45 and has a lower end portion formed with a hole 67 through which the swing arm retaining pin 13 passes so that the stopper arm 66 is pivotable around the retaining pin 13 with respect to the swing arm 45. A lug 66a is formed projecting backwardly from the lower portion of the stopper arm 66 and has a hole 69 to which is hooked the upper end of a tension spring 70 having a lower end also hooked to the hole 65 of the lug 64 so as to enable the stopper arm 66 to be biasingly rotated about the retaining pin 13 in a clockwise direction in FIG. 1. The stopper arm 66 has a lower rear face 71 which is engageable with a lug 68 which extends toward the side wall portion 47 of the swing arm 45. Further, the stopper arm 66 is bent at its itermediate portion toward the side wall portion 47 of the swing arm 45 and is formed at its upper end with a stepped engaging face 72 which is engageable with the stop projection 39 formed on the disc member 26.

An electromagnetic actuator 73 is secured to the side wall portion 3 of the retractor housing 1 by two screws 74 and has a plunger 75 reciprocably received therein. The plunger 75 is formed at its leading end portion with a slit 77 and a hole 78 and is pivotally connected to the lug 62 of the trigger member 53, with the slit 77 receiving the lug 62, by a pivotal pin 79 which passes through the hole 78 of the plunger 75 and the hole 63 of the lug 62. A compression coil spring 80 is disposed around the plunger 75 between the vertical portion 55 of the trigger member 53 and the casing of the actuator 73 so as to biasingly rotate the trigger member 53 around the retaining pin 13 in a counterclockwise direction in FIG. 1 when the actuator 73 is deenergized.

As is well known in the art, the seat belt 4 is assembled with a tongue 81 and a buckle 82 which are to be engaged when the seat occupant wears the seat belt 4 on a passenger seat. In the buckle 82 is mounted an electric switch 83 which is operative to detect an engagement state of the buckle 82 and the tongue 81 for emitting an operative signal and to detect a disengagement state of the buckle 82 and the tongue 81 for emitting an inoperative signal. The operative and inoperative signals are to adapted to energize and deenergize the electromagnetic actuator 73 to cause the plunger 75 to retract toward the casing of the actuator 73 against the compression coil spring 80 and to project toward the trigger member 53 by the force of the compression coil spring 80.

The operation of the seat belt retractor of the present invention thus constructed and arranged will be described hereinafter. However, the description of the operation of the emergency locking mechanism 10 will be omitted since the mechanism 10 is known to those skilled in the art.

Figure 4:
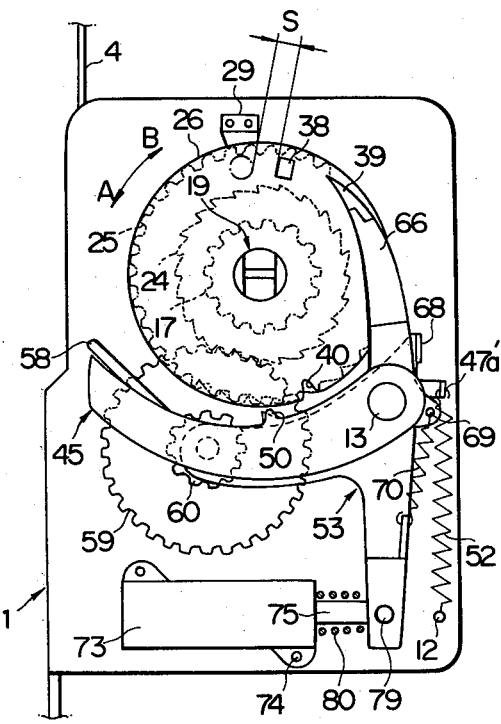
FIGS. 4 to 7 are side views of the seat belt retractor and showing operational stages under which elements or parts forming the seat belt retractor are moved and rotated.

When the tongue 81 and the buckle 82 are maintained disengaged causing deenergization of the electomagnetic actuator 73 in the initial operational stage as shown in FIG. 4, the plunger 73 is projected toward the trigger member 53 by the force of the compression coil spring 80, turning the trigger member 53 around the swing arm retaining pin 13 in the counterclockwise direction. Therefore, the horn-like projection 58 is engaged with the base wall portion 46 of the swing arm 45 so that the swing arm 45 assumes a lowest angular position where the swing arm 45 is held rotated around the retaining pin 13 against the tension spring 52 in the counterclockwise direction. Under these conditions, the idler gears 59 and 60 are kept disengaged from the drive and driven gears 17 and 25, respectively, as a consequence, the winding reel 5 can be rotated in opposite directions so that the seat belt 4 can be drawn out of the winding reel 5 and retracted on the winding reel 5 against by the force of the return spring 11.

At this state, the stop projection 38 on the disc member 26 is circumferentially spaced apart from the stop projection 44 on the cap member 37 by an interval S in such a manner that the stop projection 38 is to be engaged with the stop projection 44 when the disc member 26 is rotated in the winding direction. Further, the spear headed stop projection 39 on the disc member 26 is engaged with the stepped engaging face 72 of the stopper arm 66, and the protrusion 50 and the pawl 51 of the swing arm 45 are disengaged from the recess 40 of the disc member 26 and the tooth 15 of the ratchet wheel 14, respectively. The recess 40 is circumferentially spaced apart from the protrusion 50 by a predetermined distance in a such a manner that the recess 40 is to be engaged with the protrusion 50 when the disc member 26 is rotated in the unwinding direction. The ratchet wheel 24 is restrained from being rotated in the winding direction by the pawl member 33 and the stopper 29, the latter of which is in abutting engagement with the abutment 28 of the ratchet wheel 24.

Figure 5:
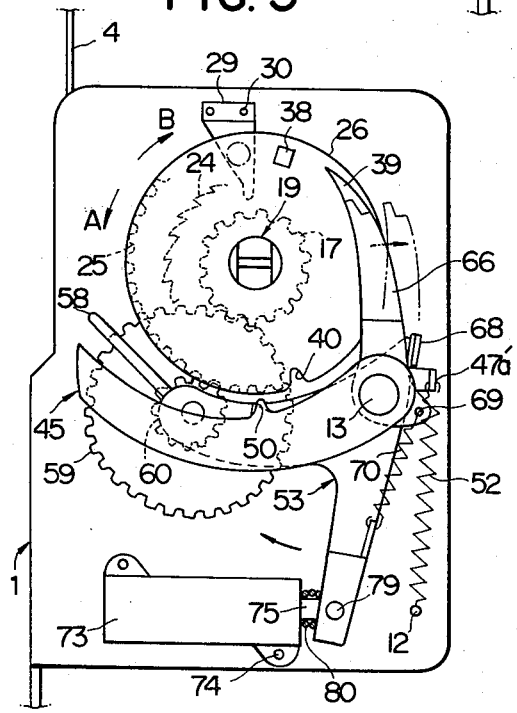

When the tongue 81 and buckle 82 are engaged in the second operational stage as shown in FIG. 5, after drawing out sufficient seat belt 4 from the winding reel 5 to permit wearing of the seat belt 4 to restrain the seated passenger, the electric switch 83 is closed to cause energization of the electromagnetic actuator 73, thereby causing the plunger 75 to move toward the casing of the actuator 73 against the compression coil spring 80. Thus, the trigger member 53 is turned around the swing arm retaining pin 13 in the clockwise direction, and the swing arm 45 is simultaneously turned in the same direction as the trigger member 53 by the force of the tension spring 52. The stopper arm 66 is simultaneously rotated around the retaining pin 13 by the tension spring 70 with the lower rear face 71 engaged with the lug 68 of the trigger member 53, with the result that the idler gears 59 and 60 are respectively brought into meshing engagement with the drive and driven gears 17 and 25 for transmitting rotational torgue to the driven gear 25 from the drive gear 17. At this time, the protrusion 50 of the swing arm 45 is held in contact with the circumference of the disc member 26 by the force of the tension spring 52, thereby causing the pawl 51 of the swing arm 45 to be maintained out of engagement from the teeth 15 of the ratchet wheel 14. As a consequence, the driven gear 25 is rotated when the winding reel 5 is rotated in the winding direction by the action of the return spring 11 until the seat belt 4 is tightened on the seated passenger. The disc member 26 is simultaneously rotated in the same direction as that of the driven gear 25 until the stop projection 38 on the disc member 26 is brought into abutting engagement with the stop projection 44 on the cap member 37 since the disc member 26 is held in frictional contact with the driven gear 25 by the conical spring 36. During rotation of the disc member 26 until the stop projection 38 is abuttingly engaged with the stop projection 44, the stepped engaging face 72 of the stopper arm 66 is brought out of engagement with the spear headed stop projection 39, thereby causing stopper arm 66 to be swung by the tension spring 70 around the swing arm retaining pin 13 in the clockwise direction to its phantom line position, indicated in phantom lines in FIG. 5, where the lower rear face 71 of the stopper arm 66 comes to be into abutting engagement with the lug 68 of the trigger member 53.

Figure 6:
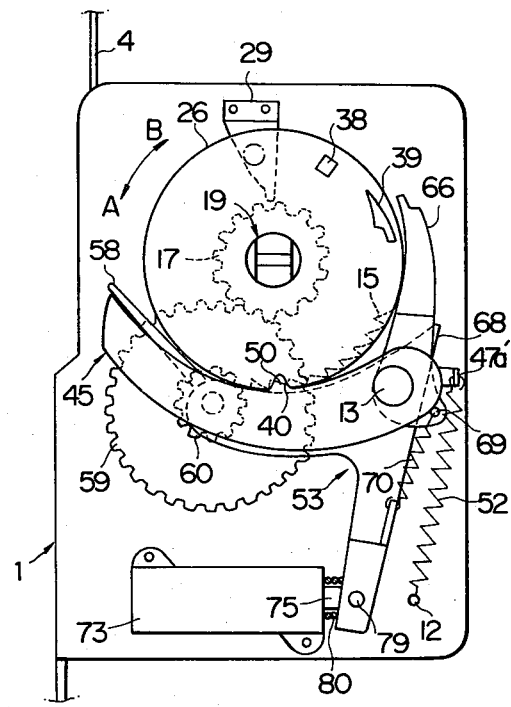

If the seat belt 4 is thus drawn out of the winding reel 5 by the seated passenger against the force of the return spring 11, the disc member 26 is rotated in the unwinding direction until the protrusion 50 of the swing arm 45 is brought into engagement with the recess 40 on the disc member 26. This operational stage is shown in FIG. 6. Simultaneously with the engagement of the protrusion 50 and the recess 40, the pawl 51 of the swing arm 45 is brought into engagement with the tooth 15 of the ratchet wheel 14 so that the winding reel 5 is prevented from rotation in the winding direction, thereby enabling the seat belt 4 to assume a tensionless belt position where the seat belt is maintained tensionless.

It is therefore understood that the seat belt 4 is kept slackened on the seated passenger by a predetermined length and that the seat belt winding motion of the winding reel 5 by the return spring 11 is no more provided. This means that the passenger wearing the seat belt 4 is applied with no oppressive or unpleasant pressure from the seat belt 4 as long as the passenger keeps his or her normal seated position, viz., sits back against the backrest of the seat.

Figure 7:
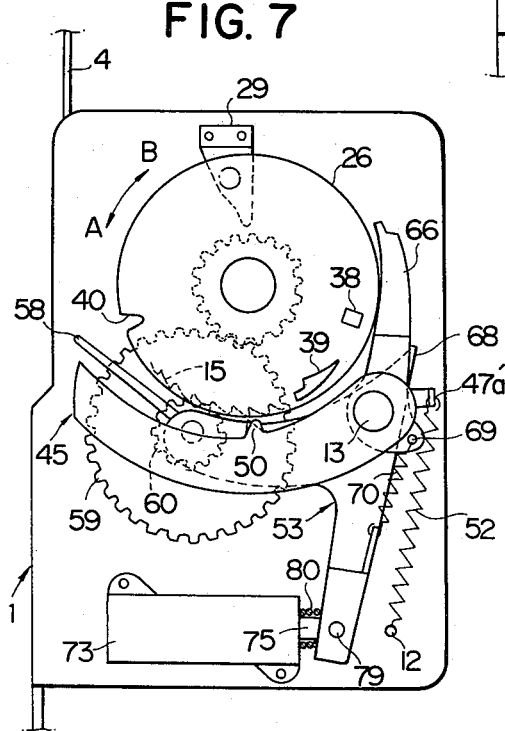

Under these conditions, if the seated passenger leans forward as for example in opening the glove locker, the seat belt 4 will be pulled out of the winding reel 5 against the force of the return spring 11, rotating the winding reel 5 in the unwinding direction. The rotation of the winding reel 5 in the unwinding direction is allowed since this rotation causes rotation of the disc member 26 in the unwinding direction, that is, in the direction to cause the protrusion 50 of the swing arm 45 to be brought out of engagement with the recess 40 of the disc member 26. Simultaneously with disengagement of the protrusion 50 and the recess 40, the pawl 51 of the swing arm 45 is brought out of engagement with the tooth 15 of the ratchet wheel 14 to allow the ratchet wheel 14 to be rotated in the unwinding direction so that the disc member 26 is rotated in the same direction through the drive gear 17, the idler gears 59, 60 and the driven gear 25. This operational stage is illustrated in FIG. 7. The rotation of the driven gear 25 is performed together with the pawl member 33 which causes the ratchet wheel 24 to be rotated in the unwinding direction while the abutment 28 is moved away from the stopper 29 in the same direction. Accordingly, the spiral spring 34 is biasingly deformed since the spring 34 is connected at its inner end to the cut-away portions 22 of the stationary shaft member 19 and at its outer end to the slit 35 of the ratchet wheel 24.

When the seated passenger returns to the normal seated position, the length of the seat belt 4 corresponding to the returning movement of the passenger is wound up on the winding reel 5 by the action of the return spring 11 since the protrusion 50 of the swing arm 45 is in contact with the circumference of the disc member 26 and the pawl 51 of the swing arm 45 is thus not in mesh with any teeth 15 of the ratchet wheel 14. During the rotation of the winding reel 5, the disc member 26 is rotated together with the driven gear 25 and the ratchet wheel 24 in the winding direction until the protrusion 50 of the swing arm 45 is brought into engagement with the recess 40 of the disc member 26 since the return biasing force of the spiral spring 34 is transmitted through the driven gear 25 to the disc member 26. Even after rotation of the ratchet wheel 24, the abutment 28 is spaced apart from the stopper 29. It will thus be understood that the length of the unwound seat belt 4 from the tensionless belt position thereof corresponding to the angular displacement of the disc member 26, i.e., the circumferential movement of the recess 40 of the disc member 26 is memorized by the ratchet wheel 24, the pawl member 33 and the spiral spring 34 which constitute as a whole tensionless belt position memorizing means.

When the seated passenger disconnects the tongue 81 from the buckle 82, the electromagnetic actuator 73 becomes deenergized, thereby causing the plunger 75 to project toward the trigger member 53 by the force of the compression coil spring 80. The trigger member 53 is turned in the counterclockwise direction, and the horn-like projection urges downwardly the base wall portion 46 of the swing arm 45 until the swing arm 45 assumes its lowest angular position. Thus, the idler gears 59 and 60 are disengaged from the drive and driven gears 17 and 25, respectively. The protrusion 50 and the pawl 51 of the swing arm 45 are respectively brought out of engagement with the recess 40 of the disc member 26 and the tooth 15 of the ratchet wheel 14 so that the winding reel 5 is rotated in the winding direction by the return spring 11 for winding the seat belt 4 thereon.

On the other hand, the ratchet wheel 24 is rotated in the winding direction until the abutment 28 comes to be engaged with the stopper 29 by the force of the spiral spring 34. Together with the rotation of the ratchet wheel 24, the driven gear 25 and the disc member 26 are rotated in the same direction of that of the ratchet wheel 24 until the spear headed stop projection 39 is brought into the stepped engaging portion 72 of the stopper arm 66 as shown in FIG. 4. This means that the memorized tensionless belt portion of the seat belt 4 is completely cancelled.

As will be understood from the foregoing description, a number of tensionless belt positions can be obtained in correspondence to passengers with various physiques who wear the seat belt. If the most adequate tensionless belt position is desired by the seated passenger who has weared the seat belt, it is sufficient that he or she merely disengages the tongue and the buckle for cancelling the memorized tensionless belt position and again inserts the tongue into the buckle without winding whole length of the seat belt around the winding reel.

From the previously mentioned description, it will be understood that the seat belt retractor according to the present invention can provide reliable restraining and safe protection to the seated passenger with a proper slack of the seat belt which excludes the seated passenger from suffering from the unpleasant and oppressive feelings.

What is claimed is:

1. A seat belt retractor for a safety belt arrangement having a seat belt attached with a buckle and a tongue engageable with each other for reliably restraining and safely protecting a seat occupant against serious injury in the case of emergency as in a collision or sudden stop of passenger vehicle, comprising;

belt retracting means comprising a retractor housing, a winding reel received in said retractor housing so as to be rotatable in directions to wind and unwind said seat belt, a return spring for biasingly urging said winding reel to rotate in the direction to wind said seat belt, a cap member securely mounted on said retractor housing, and stationary shaft member extending between said winding reel and said cap member and fixedly supported on said cap member;

signal emitting means comprising an electric switch mounted in said buckle so as to be closed and opened for respectively emitting said operative and inoperative signals when said tongue is engaged with and disengaged from said buckle;

clutching means comprising a drive gear fixed to said winding reel so as to be rotatable together therewith, a driven gear rotatably supported on said shaft member, a trigger member pivotally mounted on said retractor housing and having a pivotal axis, a pair of idler gears rotatably supported on said trigger member and engageable with said drive and driven gears, respectively, and an electromagnetic actuator connected to said trigger member and actuated in response to said operative and inoperative signals from said electric switch for making said idler gears engaged with and disengaged from said drive and driven gears, respectively, through rotation of said trigger member around said pivotal axis thereof;

belt slackening means comprising a disc member rotatably supported on said shaft member and formed on its circumference with a cut-away recess, a first stop projection fixed to said disc member, a biasing member for biasing said disc member into frictional contact with said driven gear, a second stop projection fixed to said cap member to be engageable with said first stop projection when said disc member is rotated in the direction to wind said seat belt, a spear headed stop projection fixed to said disc member between said first stop projection and said cut-away recess, a stopper arm pivotally mounted on said retractor housing to be engageable with said spear headed stop projection, and a biasing member for biasing said stopper arm into engageable with said spear headed stop projection;

tension eliminating means comprising a ratchet wheel securely mounted on said winding reel, a swing arm pivotally mounted on said retractor housing and having a pawl engageable with said ratchet wheel and a protrusion engageable with said cut-away recess of said disc member, and a swing arm biasing member for biasing said swing arm to bring said pawl into engagement with said ratchet wheel; and tensionless belt position memorizing means comprising an additional ratchet wheel rotatable supported on said shaft member between said drive and driven gears, a stopper fixed to said retractor housing for preventing said additional ratchet wheel from being rotated in the direction to wind said seat belt, a pawl member secured to said driven gear for preventing said additional ratchet wheel from being rotated in the direction to wind said seat belt, and a spiral spring having an inner end fastened to said shaft member and an outer end fastened to said additional ratchet wheel for biasingly forcing said additional ratchet wheel to be rotated in the direction to wind said seat belt.

* * * * *